(12) United States Patent
Feng et al.

(10) Patent No.: US 11,481,483 B2
(45) Date of Patent: Oct. 25, 2022

(54) MACHINE LEARNING TRAINING METHOD, CONTROLLER, DEVICE, SERVER, TERMINAL AND MEDIUM

(71) Applicant: BAIDU ONLINE NETWORK TECHNOLOGY (BEIJING) CO., LTD., Beijing (CN)

(72) Inventors: Zhi Feng, Beijing (CN); Yu Zhang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 421 days.

(21) Appl. No.: 16/745,510

(22) Filed: Jan. 17, 2020

(65) Prior Publication Data

US 2020/0234198 A1 Jul. 23, 2020

(30) Foreign Application Priority Data

Jan. 22, 2019 (CN) .......................... 201910058366.7

(51) Int. Cl.
*G06F 21/53* (2013.01)
*G06F 21/57* (2013.01)
*G06F 21/62* (2013.01)

(52) U.S. Cl.
CPC .............. *G06F 21/53* (2013.01); *G06F 21/57* (2013.01); *G06F 21/6209* (2013.01); *G06F 2221/2107* (2013.01)

(58) Field of Classification Search
CPC ............. G06F 21/53; G06F 21/57–577; G06F 21/62–629; H04L 63/04; H04L 63/0428–0457; H04L 63/20; H04L 67/10; H04L 67/1097
See application file for complete search history.

(56) References Cited

U.S. PATENT DOCUMENTS

2017/0372226 A1* 12/2017 Costa ...................... G06F 21/60
2019/0228299 A1* 7/2019 Chandran ............ G06N 3/0454
2019/0392305 A1* 12/2019 Gu ........................ G06N 3/063

* cited by examiner

*Primary Examiner* — Kevin Bechtel
(74) *Attorney, Agent, or Firm* — Fay Sharpe LLP (57) ABSTRACT

Embodiments of the present disclosure disclose a machine learning training method and a server. The method includes: acquiring training data uploaded by the terminal; creating a trusted execution environment in response to a machine learning training request from the terminal; and performing machine learning training based on the trusted execution environment and the training data.

9 Claims, 5 Drawing Sheets

MACHINE LEARNING TRAINING METHOD, CONTROLLER, DEVICE, SERVER, TERMINAL AND MEDIUM

CROSS-REFERENCE TO RELATED APPLICATION

This application claims priority to and benefits of Chinese Patent Application Serial No. 201910058366.7, filed with the State Intellectual Property Office of P. R. China on Jan. 22, 2019, the entire content of which is incorporated herein by reference.

FIELD

Embodiments of the present disclosure relate to a technical field of the computer technology, and more particularly, to a machine learning training method, a controller, a device, a server, a terminal and a medium.

BACKGROUND

Machine learning can utilize data and experience to improve computer algorithms and is applied to many fields, such as data mining, natural language processing, speech recognition and robotics. With the development of Internet and artificial intelligence, machine learning has become a further popular subject.

Training models through machine learning requires the use of a large amount of sample data, which is typically from enterprises or users and often involves private data. Therefore, how to ensure that the private data will not be maliciously revealed in a model training process becomes an urgent problem. Furthermore, when training with privacy data from multiple data providers, it is also desirable to ensure that the privacy data from one party will not be acquired by another one.

SUMMARY

An embodiment of the present disclosure provides a machine learning training method, applied to a machine learning controller in a server. The method includes:
  acquiring training data uploaded by a terminal;
  creating a trusted execution environment in response to a machine learning training request from the terminal; and
  performing machine learning training based on the trusted execution environment and the training data.

An embodiment of the present disclosure further provides a machine learning training method, applied to a terminal. The method includes:
  uploading training data to a machine learning controller in a server; and
  sending a machine learning training request to the machine learning controller, so as to enable the machine learning controller to create a trusted execution environment and to perform machine learning training based on the trusted execution environment and the training data.

An embodiment of the present disclosure further provides a machine learning controller configured in a server. The controller includes:
  a training data acquisition module, configured to acquire training data uploaded by a terminal;
  an environment creating module, configured to create a trusted execution environment in response to a machine learning training request from the terminal; and
  a training module, configured to perform machine learning training based on the trusted execution environment and the training data.

An embodiment of the present disclosure further provides a machine learning training device configured in a terminal. The device includes:
  a training data uploading module, configured to upload training data to a machine learning controller in a server; and
  a training request sending module, configured to send a machine learning training request to the machine learning controller, so as to enable the machine learning controller to create a trusted execution environment and to perform machine learning training based on the trusted execution environment and the training data.

An embodiment of the present disclosure further provides a server, including:
  one or more processors;
  a storage device, configured to store one or more programs,
  in which, when the one or more programs are executed by the one or more processors, the one or more processors are configured to implement the machine learning training method applied to the machine learning controller in the server as described in any one of the embodiments of the present disclosure.

An embodiment of the present disclosure further provides a computer readable storage medium having a computer program stored thereon that, when executed by a processor, the machine learning training method applied to the machine learning controller in the server as described in any one of the embodiments of the present disclosure is implemented.

An embodiment of the present disclosure further provides a terminal, including:
  one or more processors;
  a storage device, configured to store one or more programs,
  in which, when the one or more programs are executed by the one or more processors, the one or more processors are configured to implement the machine learning training method applied to the terminal as described in any one of the embodiments of the present disclosure.

An embodiment of the present disclosure further provides a computer readable storage medium having a computer program stored thereon that, when executed by a processor, the program implements the machine learning training method applied to the terminal as described in any one of the embodiments of the present disclosure.

DETAILED DESCRIPTION

The present disclosure will be described in detail below with reference to the accompanying drawings and the embodiments. It should be understood that, the specific embodiments described herein are only used to explain the present disclosure rather than to limit the present disclosure. In addition, it should also be noted that, for convenience of description, only part but not all structures related to the present disclosure is illustrated in the accompanying drawings.

Embodiment 1

Figure 1:
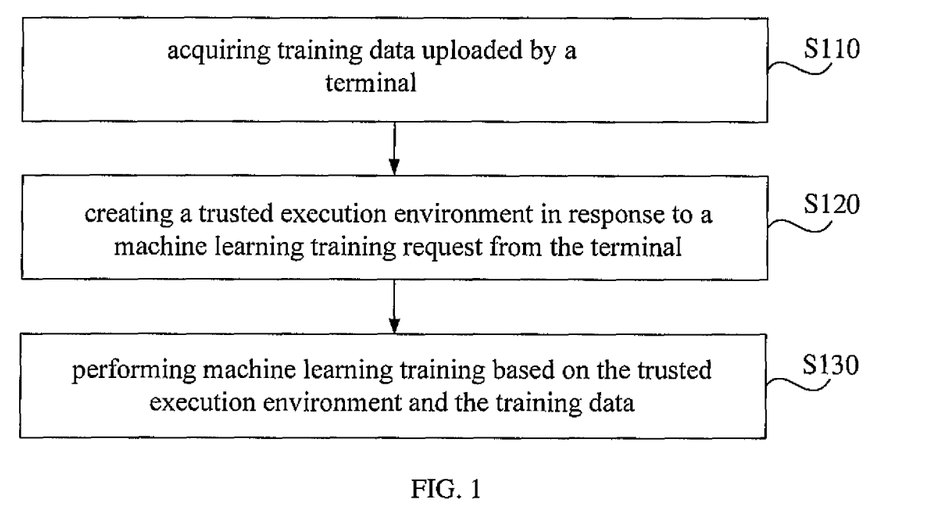
FIG. 1 is a flowchart of a machine learning training method according to embodiment 1 of the present disclosure.

FIG. 1 is a flowchart of a machine learning training method according to embodiment 1 of the present disclosure. The embodiment is applicable to a case of performing machine learning training. The method is applied to a machine learning controller in a server, and may be executed by the machine learning controller configured in the server. The controller may be implemented in software and/or hardware.

As illustrated in FIG. 1, the machine learning training method according to the present embodiment may include actions at blocks S110 to S130.

At block S110, training data uploaded by a terminal is acquired.

The server is configured with a machine learning controller (ML Controller). The server starts the machine learning controller first before performing machine learning training. And then, in response to a training data uploading request triggered by a user, the terminal uploads the training data to the machine learning controller. For example, a client related to the machine learning training may be installed on the terminal, so that the terminal may upload the training data to the machine learning controller through the client in response to a training data uploading request.

At block S120, a trusted execution environment is created in response to a machine learning training request from the terminal.

The machine learning training request is a trigger condition to create the trusted execution environment (Enclave). The terminal may send the machine learning training request to the machine learning controller after the machine learning controller receives the training data. Alternatively, the terminal may send the machine learning training request to the machine learning controller at the same time when the terminal uploads the training data to the machine learning controller, which is not limited in the embodiment. That is, there is no strict execution order limitation between block S110 and block S120.

The operation of the machine learning controller and the creation of the trusted execution environment are conducted simultaneously. During the operating process of the machine learning controller, the trusted execution environment is created by loading a class library (a so file), in which loaded files include a compiled modeling algorithm, and by calling a function in the so file. The trusted execution environment is created only when the machine learning controller performs the machine learning training, and will be released after the machine learning training is finished.

At block S130, the machine learning training is performed based on the trusted execution environment and the training data.

In this embodiment, the server system includes two parts: the machine learning controller and the trusted execution environment. The machine learning controller may control various logical operations implemented within the trusted execution environment. When the trusted execution environment is created and the machine learning controller acquires the required training data, the machine learning controller may train the training data in the trusted execution environment to obtain a training model.

In detail, the trusted execution environment is a secure software environment in a trusted system (Intel Software Guard Extensions, SGX) of the Intel system. The training data and the machine learning training operation are encapsulated in the trusted execution environment, so that an attack on the training data and the training model launched by malicious software or an illegal program may be avoided. Moreover, thanks to advantages of SGX, even if the malicious software or the illegal program acquires root authority of the server system, malicious access to data and program codes in the trusted execution environment cannot be performed. Therefore, the machine learning training based on the trusted execution environment has high safety, and both the safety of the training data related to user privacy and the safety of the training model may be ensured.

With the technical solution of the embodiment, the training data uploaded by the terminal is acquired, the trusted execution environment is created in response to the machine learning training request from the terminal, and the machine learning training is performed on the training data based on the trusted execution environment, so that the problem of potential safety hazards in the training data related to user privacy in the traditional model training process is solved, and the effect of ensuring both the safety of the training data related to user privacy and the safety of the training model is realized by using a secure software environment in the model training process.

Embodiment 2

Figure 2:
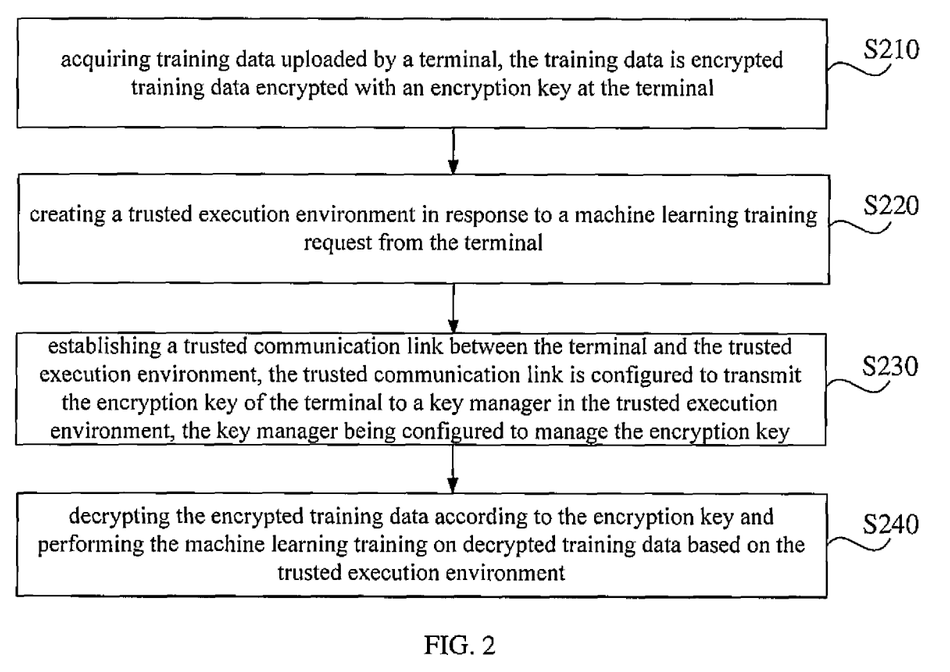
FIG. 2 is a flowchart of a machine learning training method according to embodiment 2 of the present disclosure.

FIG. 2 is a flowchart of a machine learning training method according to embodiment 2 of the present disclosure. The present embodiment is optimized on the basis of embodiment 1. As illustrated in FIG. 2, the method may include actions at blocks S210 to S240.

At block S210, the training data uploaded by the terminal is acquired, in which the training data is encrypted training data encrypted with an encryption key at the terminal.

The terminal may encrypt the training data by using any data encryption method before uploading the encrypted training data to the machine learning controller in the server. For example, the terminal may encrypt the training data with a symmetric encryption algorithm such as AES GCM encryption algorithm supporting 128 bits.

In addition, in the process of encrypting the training data by the terminal, the training data may be encrypted as a whole, or may be encrypted by blocks. For example, the training data is divided according to the size of the training data to obtain at least one data block. And then, each data block is encrypted to obtain at least one encrypted data block. Finally, the at least one encrypted data block is sequentially uploaded to the machine learning controller in the server by blocks. The encrypted data block is a binary ciphertext, and each encrypted data block may be organized by using PB (Protocol Buffer, a format for data exchange), a data encoding format, to form a set of encrypted data blocks. By performing encryption by blocks, encrypted blocks may be decrypted by blocks in the subsequent decryption process, so that the encryption and decryption calculation pressure of the server may be relieved, and the encryption efficiency and the decryption efficiency may be improved.

At block S220, a trusted execution environment is created in response to a machine learning training request from the terminal.

At block S230, a trusted communication link is established between the terminal and the trusted execution environment, in which the trusted communication link is configured to transmit the encryption key of the terminal to a key manager in the trusted execution environment, the key manager being configured to manage the encryption key.

Decryption of the training data varies depending on different encryption methods. For a symmetric encryption algorithm, the encrypted training data is decrypted by using the same key as the encryption key. In order to guarantee safety of transmitting the encryption key, the machine learning controller may call a communication link creation function to establish the trusted communication link between the terminal and the trusted execution environment. The trusted communication link is specially configured to transmit the encryption key. For example, the trusted communication link between the terminal and the trusted execution environment is generated through a Diffie-Hellman Key exchange protocol (DH exchange protocol), the encryption key is encrypted by using the DH exchange protocol, and then the encrypted encryption key is transmitted to the key manager in the trusted execution environment. The DH exchange protocol may ensure that a shared encryption key securely traverses across an insecure network environment.

Alternatively, before establishing the trusted communication link between the terminal and the trusted execution environment, the method further includes: sending information to be authenticated of the server and the trusted execution environment to the terminal, and enabling the terminal to perform remote authentication on the trusted execution environment through a remote authentication server of the trusted execution environment according to the information to be authenticated; and executing an operation of establishing the trusted communication link when the authentication is successful.

Figure 3:
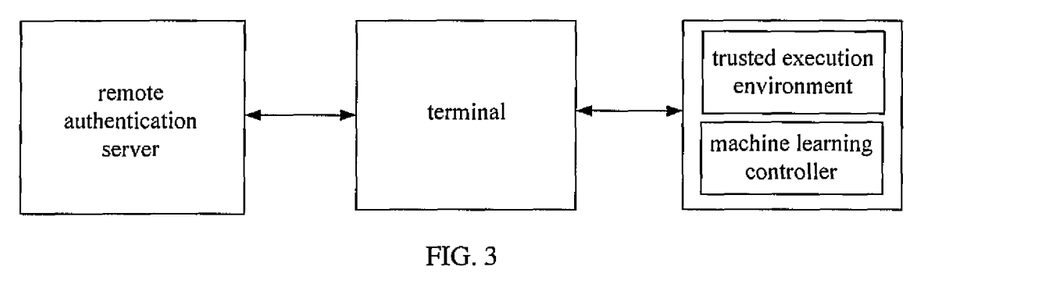
FIG. 3 is a flowchart of authenticating a trusted execution environment according to embodiment 2 of the present disclosure.

For example, FIG. 3 is a flowchart of authenticating a trusted execution environment according to embodiment 2 of the present disclosure. As illustrated in FIG. 3, first the machine learning controller in the server sends the information to be authenticated of the server and the trusted execution environment to the terminal through an authenticated channel. The information to be authenticated includes, but is not limited to, software and hardware platform information of the server and fingerprint information of the trusted execution environment. The terminal integrates an Intel remote authentication tool. After receiving the information to be authenticated, the terminal or a corresponding client on the terminal forwards the information to be authenticated to the remote authentication server (also called an attestation server) of the trusted execution environment. The remote authentication server may perform validity verification on the received information to be authenticated and returns a verification result to the terminal. After that, the terminal forwards the verification result to the machine learning controller, so that validity and integrity of the machine learning service in the trusted execution environment are authenticated. After the authentication is completed, the machine learning controller establishes the trusted communication link between the terminal and the trusted execution environment.

At block S240, the encrypted training data is decrypted according to the encryption key and the machine learning training is performed on the decrypted training data based on the trusted execution environment.

In the trusted execution environment, the machine learning controller calls the encryption key in the key manager to decrypt the encrypted training data, and then extracts characteristics of the decrypted training data for machine learning training.

With the technical solution of the embodiment, the training data encrypted by the terminal is obtained, the trusted execution environment is created in response to the machine learning training request from the terminal, the encrypted training data is decrypted by using the encryption key in the trusted execution environment, and then the machine learning training is performed on the decrypted training data, so that the problem of potential safety hazards in the training data related to user privacy in the traditional model training process is solved, and the effect of ensuring both the safety of the training data related to user privacy and the safety of the training model is realized by using a secure software environment in the model training process. In addition, the encryption key is directly transmitted from the terminal to the key manager of the trusted execution environment via the trusted communication link, so that the encryption key is prevented from being leaked during the transmission process, and the safety of the training data is further ensured.

Embodiment 3

Figure 4:
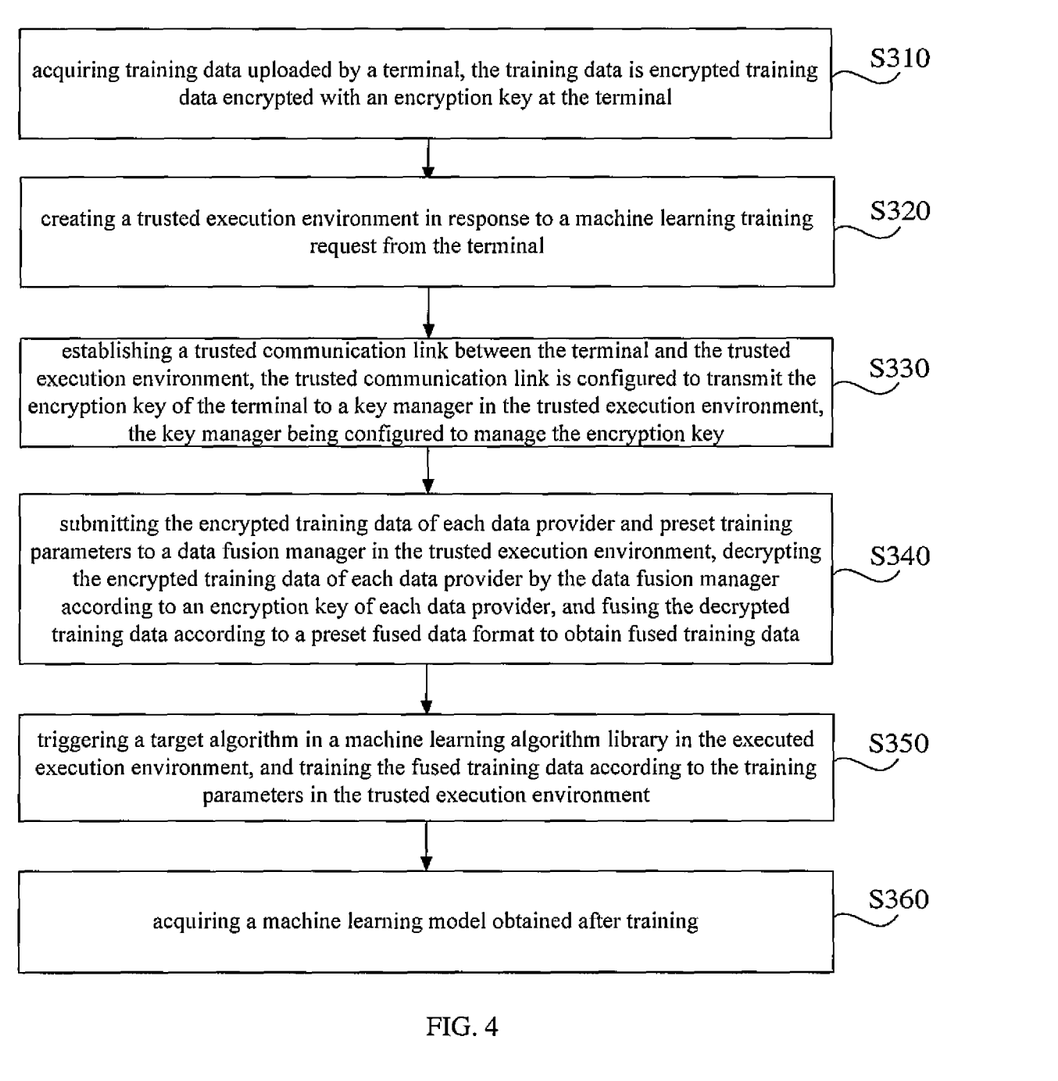
FIG. 4 is a flowchart of a machine learning training method according to embodiment 3 of the present disclosure.

FIG. 4 is a flowchart of a machine learning training method according to embodiment 3 of the present disclosure. As illustrated in FIG. 4, the method may include actions at blocks S310 to S360.

At block S310, the training data uploaded by the terminal is acquired, in which the training data is the encrypted training data encrypted with the encryption key at the terminal.

At block S320, the trusted execution environment is created in response to the machine learning training request from the terminal.

At block S330, the trusted communication link is established between the terminal and the trusted execution environment, in which the trusted communication link is configured to transmit the encryption key of the terminal to the key manager in the trusted execution environment, the key manager being configured to manage the encryption key.

The training data in this embodiment may include training data from at least two data providers (hereinafter referred to as multi-party training data). All the data providers, by using their own terminals, interact with the same server configured with the machine learning controller. For example, each data provider encrypts the training data in a whole or by blocks by using the encryption key in respective terminal, and then uploads the encrypted training data to the machine learning controller respectively. At the same time, each terminal transmits its encryption key to the key manager through the trusted communication link in the trusted execution environment.

At block S340, the encrypted training data of each data provider and preset training parameters are submitted to a data fusion manager in the trusted execution environment, the encrypted training data of each data provider is decrypted by the data fusion manager according to the encryption key of each data provider, and fused training data is obtained by fusing the decrypted training data according to a preset fused data format.

The machine learning controller submits the acquired multi-party training data to the data fusion manager in the trusted execution environment, calls respective encryption keys from the key manager for decryption and fuses the decrypted training data. According to characteristics of the multi-party training data, an applicable fusing mode may be flexibly selected. For example, ways of the fusing operation of the multi-party training data may include: splitting data column by column and splitting data row by row. For the case that data is fused after being split row by row, the number of data columns of the multi-party training data is the same. For example, training data A1 provided by one data provider may be split into m rows, training data B1 provided by another data provider may be split into n rows, and the row number of the fused training data obtained after fusing is m+n. For the case that data is fused after being split column by column, the number of data rows of the multi-party training data is the same. For example, training data A2 provided by one data provider may be split into m columns, training data B2 provided by another data provider may be split into n columns, and the column number of the fused training data obtained after fusing is m+n. The format of the fusing data may be a data format used by LIBSVM (software package for SVM pattern recognition and regression). After the data fusing operation in the data fusion manager is finished, a feedback message indicating fusing completion may be returned to the machine learning controller.

In addition, the data submitted to the data fusion manager by the machine learning controller further includes preset training parameters, which may include various parameters involved in the machine learning algorithm, such as the number of iterations in the training and the step-size per iteration.

At block S350, a target algorithm in a machine learning algorithm library in the executed execution environment is triggered, and the fused training data is trained in the trusted execution environment according to the training parameters.

After receiving the feedback message indicating the completion of data fusing, the machine learning controller triggers the target algorithm in a machine learning algorithm library (ML library) in the trusted execution environment. The target algorithm may be any one of the algorithms in the machine learning algorithm library, such as the logistic regression (LR) algorithm, the K-means clustering algorithm, the neural network algorithm and the gradient boosting decision tree (GBDT) algorithm. The target algorithm is related to specific requirements on the machine learning training, which is not limited in the embodiment.

At block S360, a machine learning model obtained after training is acquired.

After the training of the machine learning model is completed in the trusted execution environment, the feedback message indicating the completion of the training is returned to the machine learning controller. The machine learning controller acquires the trained machine learning model and distributes the machine learning model to the terminal after receiving the feedback message indicating the completion of the training.

According to practical applications, the machine learning controller may selectively and publicly distribute the trained machine learning model to one or more of the plurality of data providers, which is not particularly limited in the embodiment. Alternatively, the machine learning model acquired by the machine learning controller is an encrypted model in the machine learning algorithm library of the trusted execution environment. For example, the machine learning controller may encrypt, in the trusted execution environment, the machine learning model by calling the encryption key of at least one target terminal in the key manager, and then distributes the encrypted model to a corresponding target terminal. The target terminal may decrypt the encrypted model by using its own encryption key after receiving the encrypted model. The target terminal is a terminal selected by the machine learning controller to which the machine learning controller discloses the training model. In addition, the training model may also be encrypted for several times by using the encryption keys of the plurality of target terminals, and then both the plurality of used encryption keys and the encrypted training model are distributed to the target terminal.

Certainly, after the machine learning controller acquires the machine learning model, the training model may be permanently stored in a designated space, so that each terminal may download the model from the designated space as needed.

Figure 5:
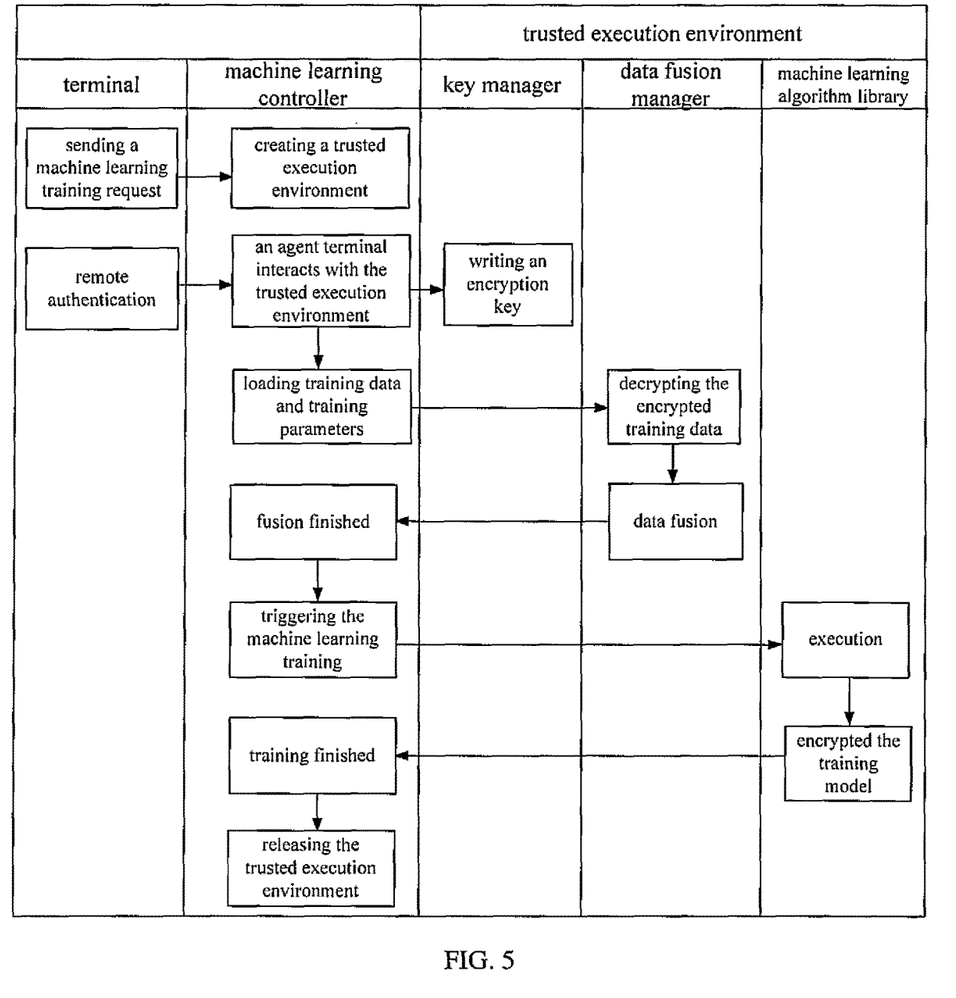
FIG. 5 is a flowchart of a machine learning training method according to embodiment 3 of the present disclosure.

FIG. 5 is a flowchart of another machine learning training method according to embodiment 3 of the present disclosure. FIG. 5 further illustrates the embodiment by way of example, and should not be construed as a specific limitation on the embodiment. As illustrated in FIG. 5, the server system includes the machine learning controller and the trusted execution environment. The trusted execution environment includes the key manager, the data fusion manager and the machine learning algorithm library. The method of the embodiment includes the followings.

1) The terminal sends a machine learning request to the machine learning controller.

2) The machine learning controller creates the trusted execution environment.

3) An agent terminal of the machine learning controller interacts with the trusted execution environment; and the terminal executes remote authentication of the trusted execution environment and writes an encryption key into the key manager in the trusted execution environment for management.

4) The machine learning controller loads the encrypted training data and preset training parameters and submits the encrypted training data and the preset training parameters to the data fusion manager in the trusted execution environment for data decryption and data fusing.

5) After receiving the feedback message indicating the completion of fusing, the machine learning controller automatically triggers the target algorithm in the machine learning algorithm library in the trusted execution environment, executes the machine learning training based on the trusted execution environment, encrypts the training model and returns the encrypted training model to the machine learning controller.

6) After the training process is finished, the machine learning controller permanently stores the encrypted training model and releases the trusted execution environment.

It should be noted that when the training data comes from a plurality of data providers, a computing environment for executing the solution of the embodiment may be created according to a cloud environment, or any one of the plurality of data providers may provide the computing environment for executing the solution of embodiment. No matter how the computing environment is created, for each data provider, due to a security characteristic of the trusted execution environment, the training data of the data provider cannot be acquired by any other data provider, so that the privacy and the security among the data providers of the multi-party data are ensured. In addition, the solution of the embodiment may ensure high machine learning training efficiency, and the training efficiency is not influenced by the increase of the amount of the training data.

Furthermore, the training data may include training data from a single data provider. Correspondingly, decrypting the encrypted training data according to the encryption key and performing the machine learning training on the decrypted training data based on the trusted execution environment includes: submitting the encrypted training data and preset training parameters to a data fusion manager in the trusted execution environment, and decrypting the encrypted training data by the data fusion manager according to the encryption key; triggering a target algorithm in a machine learning algorithm library in the executed execution environment, and training the decrypted training data according to the training parameters in the executed execution environment; and acquiring the machine learning model obtained after training.

When the training data is provided by one data provider, the data fusion manager does not need to execute the data fusing operation, and a prompt message may be sent to the machine learning controller after decrypting the encrypted data is finished, so as to prompt the machine learning controller to trigger the execution of the machine learning training. For this case, even if the data provider outsources its original training data for machine learning training the original training data of the data provider will not be revealed during the machine learning training process due to the creation of the trusted execution environment.

With the technical solutions of the embodiment, the encrypted training data provided by the plurality of data providers uploaded by the terminal is acquired, the trusted execution environment is created in response to the machine learning training request from the terminal, the decryption and fusing operations are performed on the multi-party encrypted training data in the data fusion manager in the trusted execution environment, and then the target algorithm is triggered to train the fused training data, so that the problem of potential safety hazards in the training data related to user privacy in the traditional model training process is solved, and the effect of ensuring the safety of the training data related to user privacy and the safety of the training model is realized by using a secure software environment in the model training process. In addition, based on the trusted execution environment and under the premise of realizing the protection of private data, the effect of fusing the multi-party training data in any fusing mode and using the fused multi-party training data simultaneously for the machine learning training is realized.

Embodiment 4

Figure 6:
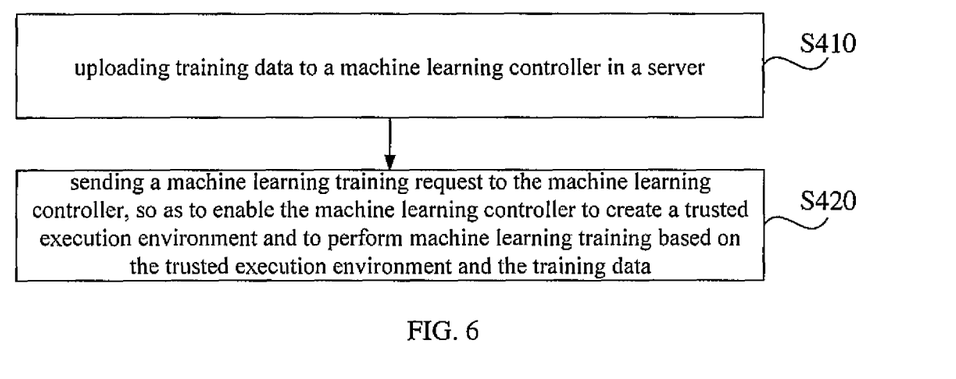
FIG. 6 is a flowchart of a machine learning training method according to embodiment 4 of the present disclosure.

FIG. 6 is a flowchart of a machine learning training method according to embodiment 4 of the present disclosure. The present embodiment, which is applied to the terminal, is applicable to a case of performing the machine learning training, and is executed in cooperation with the machine learning training method applied to the machine learning controller in the server according to the above embodiments of the present disclosure. The method of the present embodiment may be executed by a machine learning training device configured in the terminal, and the device may be implemented in software and/or hardware.

As illustrated in FIG. 6, the machine learning training method provided by the present embodiment may include actions at blocks S410 and S420.

At block S410, training data is uploaded to the machine learning controller in the server.

At block S420, a machine learning training request is sent to the machine learning controller to enable the machine learning controller to create a trusted execution environment and to perform the machine learning training based on the trusted execution environment and the training data.

Alternatively, uploading the training data to the machine learning controller in the server includes: encrypting the training data in blocks using an encryption key to obtain encrypted training data, in which the encrypted training data includes at least one encrypted data block; and uploading the encrypted training data to the machine learning controller in the server in blocks sequentially.

Alternatively, sending the machine learning training request to the machine learning controller to enable the machine learning controller to create the trusted execution environment and to perform the machine learning training based on the trusted execution environment and the training data includes followings. The machine learning training request is sent to the machine learning controller, so as to enable the machine learning controller to create the trusted execution environment. Information to be authenticated of the server and the trusted execution environment sent by the machine learning controller is received, and remote authentication is performed on the trusted execution environment based on the information to be authenticated through a remote authentication server in the trusted execution environment, so as to enable the machine learning controller to establish a trusted communication link between the terminal and the trusted execution environment after the remote authentication is successful. The encryption key is sent to the trusted execution environment through the trusted communication link, so as to enable the machine learning controller to decrypt the encrypted training data according to the encryption key and to perform the machine learning training on the decrypted training data based on the trusted execution environment.

With the technical solution of the embodiment, the training data is uploaded to the machine learning controller in the server, the machine learning training request is sent to the machine learning controller to enable the machine learning controller to create the trusted execution environment and to perform the machine learning training on the training data based on the trusted execution environment, so that the problem of potential safety hazards in the training data related to user privacy in the traditional model training process is solved, and the effect of ensuring the safety of the training data related to user privacy and the safety of the training model is realized by using a secure software environment in the model training process. Furthermore, the safety of the training data and the training model is guaranteed through legality authentication of the trusted execution environment.

The following are embodiments of a machine learning controller and a machine learning training device provided by embodiments of the present disclosure, and both the controller and the device belong to the same invention concept as that of the machine learning training methods in the above embodiments. For details that are not described in detail in the embodiments of the machine learning controller and the machine learning training device, reference may be made to the description in the embodiments of the machine learning training method described above.

Embodiment 5

Figure 7:
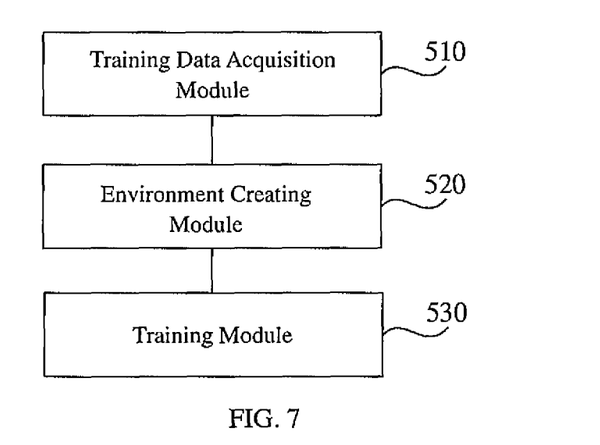
FIG. 7 is a block diagram of a machine learning controller according to embodiment 5 of the present disclosure.

FIG. 7 is a schematic structure diagram of a machine learning controller according to embodiment 5 of the present disclosure. The present embodiment is applicable to a case of performing the machine learning training, and the controller may be implemented in software and/or hardware, and may be configured in the server.

As illustrated in FIG. 7, the machine learning controller provided by the present embodiment may include a training data acquisition module 510, an environment creation module 520 and a training module 530.

The training data acquisition module 510 is configured to acquire training data uploaded by a terminal.

The environment creating module 520 is configured to create a trusted execution environment in response to a machine learning training request from the terminal.

The training module 530 is configured to perform the machine learning training based on the trusted execution environment and the training data.

Alternatively, the training data acquired in the training data acquisition module 510 is encrypted training data encrypted with the encryption key at the terminal.

Accordingly, the training module 530 includes a trusted communication link establishing unit and a decrypted data training unit.

The trusted communication link establishing unit is configured to establish the trusted communication link between the terminal and the trusted execution environment, in which the trusted communication link is configured to transmit the encryption key of the terminal to a key manager in the trusted execution environment, and the key manager is configured to manage the encryption key.

The decrypted data training unit is configured to decrypt the encrypted training data according to the encryption key based on the trusted execution environment and to perform the machine learning training on the decrypted training data.

Alternatively, the training module 530 further includes a remote authentication unit.

The remote authentication unit is configured to, before the trusted communication link establishing unit executes establishing the trusted communication link between the terminal and the trusted execution environment, send information to be authenticated of the server and the trusted execution environment to the terminal, and to enable the terminal to perform remote authentication on the trusted execution environment through a remote authentication server of the trusted execution environment based on the information to be authenticated.

The trusted communication link establishing unit executes the operation of establishing the trusted communication link when the authentication is successful.

Alternatively, the training data acquired in the training data acquisition module 510 includes training data from a single data provider.

Correspondingly, the decrypted data training unit includes a first decryption subunit, a first training subunit and a first model acquisition subunit.

The first decryption subunit is configured to submit the encrypted training data and the preset training parameters to the data fusion manager in the trusted execution environment and to decrypt the encrypted training data by the data fusion manager according to the encryption key.

The first training subunit is configured to trigger a target algorithm in the machine learning algorithm library in the executed execution environment, and to train the decrypted training data according to the training parameters in the executed execution environment.

The first model acquisition subunit is configured to acquire the machine learning model obtained after training.

Alternatively, the training data acquired in the training data acquisition module 510 includes the training data from at least two data providers.

Correspondingly, the decrypted data training unit includes a decryption and fusing subunit, a second training subunit and a second model acquisition subunit.

The decryption and fusing subunit is configured to submit the encrypted training data of each data provider and preset training parameters to the data fusion manager in the trusted execution environment, to decrypt the encrypted training data of each data provider according to the encryption key of each data provider by the data fusion manager, and to fuse the decrypted training data according to the preset fused data format to obtain the fused training data.

The second training subunit is configured to trigger the target algorithm in the machine learning algorithm library in the executed execution environment, and to train the fused training data according to the training parameters in the trusted execution environment.

The second model acquisition subunit is configured to acquire the machine learning model obtained after training.

Alternatively, a manner of the fusing operation in the decryption and fusing subunit includes: splitting data column by column and splitting data row by row.

Alternatively, the machine learning models acquired in the first model acquisition subunit and the second model acquisition subunit are encrypted models in the machine learning algorithm library in the trusted execution environment.

The machine learning controller configured in the server according to the embodiment of the present disclosure may execute the machine learning training method applied to the machine learning controller in the server according to any embodiment of the present disclosure, and has functional modules and beneficial effects corresponding to the executed method.

Embodiment 6

Figure 8:
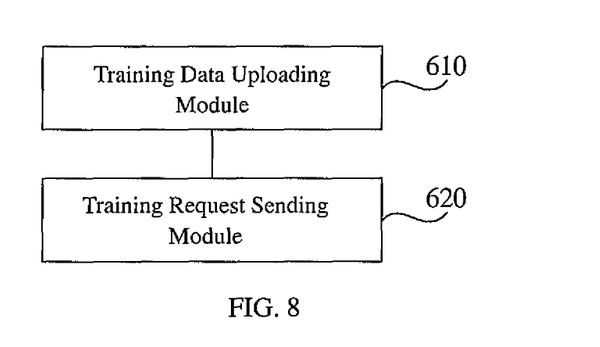
FIG. 8 is a block diagram of a machine learning training device according to embodiment 6 of the present disclosure.

FIG. 8 is a schematic structure diagram of a machine learning training device according to embodiment 6 of the present disclosure. The present embodiment is applicable to a case of performing the machine learning training, and the device may be implemented in a software and/or hardware manner and may be configured in a terminal.

As illustrated in FIG. 8, the machine learning training device provided by the present embodiment may include a training data uploading module 610 and a training request sending module 620.

The training data uploading module 610 is configured to upload the training data to a machine learning controller in the server.

The training request sending module 620 is configured to send a machine learning training request to the machine learning controller, so as to enable the machine learning controller to create a trusted execution environment and to perform the machine learning training based on the trusted execution environment and the training data.

Alternatively, the training data uploading module 610 includes a blocking encryption subunit and a blocking uploading subunit.

The blocking encryption subunit is configured to encrypt the training data in blocks using the encryption key to obtain the encrypted training data, in which the encrypted training data includes at least one encrypted data block.

The blocking uploading subunit is configured to upload the encrypted training data to the machine learning controller in the server in blocks sequentially.

Alternatively, the training request sending module 620 includes a training request sending subunit, a to-be-authenticated information receiving subunit and an encryption key sending subunit.

The training request sending subunit is configured to send the machine learning training request to the machine learning controller, so as to enable the machine learning controller to create the trusted execution environment.

The to-be-authenticated information receiving subunit is configured to receive information to be authenticated of the server and the trusted execution environment sent by the machine learning controller, and to perform, based on the information to be authenticated, remote authentication on the trusted execution environment through a remote authentication server of the trusted execution environment, so as to enable the machine learning controller to establish the trusted communication link between the terminal and the trusted execution environment after the remote authentication is successful.

The encryption key sending subunit is configured to send the encryption key to the trusted execution environment through the trusted communication link, so as to enable the machine learning controller to decrypt the encrypted training data according to the encryption key and to perform the machine learning training on the decrypted training data based on the trusted execution environment.

The machine learning training device configured at the terminal according to the embodiment of the present disclosure may execute the machine learning training method applied to the terminal according to any embodiment of the present disclosure, and has functional modules and beneficial effects corresponding to the executed method.

Embodiment 7

Figure 9:
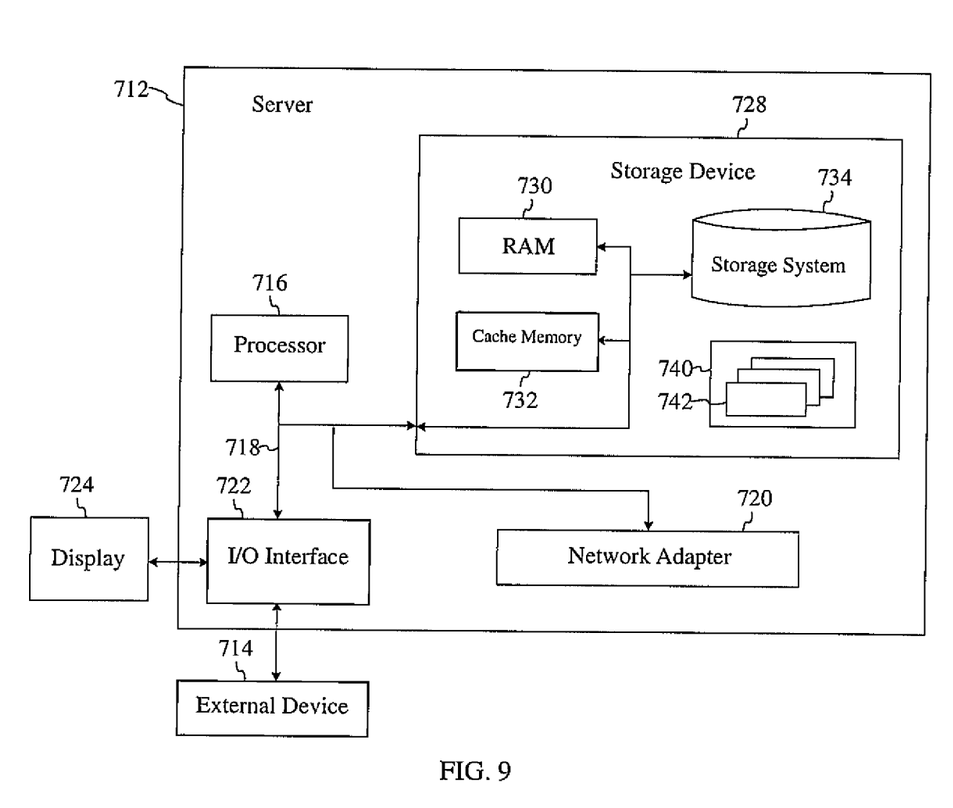
FIG. 9 is a schematic diagram of a server according to embodiment 7 of the present disclosure.

FIG. 9 is a schematic diagram of a server according to embodiment 7 of the present disclosure. FIG. 9 illustrates a block diagram of an exemplary server 712 applicable for implementing an embodiment of the present disclosure. The server 712 illustrated in FIG. 9 is merely an example, and is not to impose any limitation on the function and usage of the embodiments of the present disclosure.

As illustrated in FIG. 9, the server 712 is implemented as a generic server. Components of the server 712 may include, but are not limited to, one or more processors 716, a storage device 728, and a bus 718 for connecting different system components (including the storage device 728 and the processors 716).

The bus 718 may be implemented as one or more bus architectures, including a storage device bus or a storage device controller, a peripheral bus, an accelerated graphics port, a processor, or a local bus with any of the bus architectures. For example, the bus architectures include, but are not limited to, an industry subversive alliance (ISA) bus, a micro channel architecture (MAC) bus, an enhanced ISA bus, a video electronics standards association (VESA) local bus and a peripheral component interconnect (PCI) bus.

The server 712 typically includes various computer system readable media. The media may be any available media that may be accessed by the server 712, including volatile and non-volatile media, removable and non-removable media.

The storage device 728 may include a computer system readable medium in the form of a volatile memory, such as a random access memory (RAM) 730 and/or a cache memory 732. The server 712 may further include other removable/non-removable and volatile/non-volatile computer system storage media. As an example only, a storage system 734 may be configured to read from or write to a non-removable and non-volatile magnetic medium (not shown in FIG. 9, and generally referred as a "hard disk drive"). Although not shown in FIG. 9, a magnetic-disk drive configured to read from or write to a removable and nonvolatile magnetic disk (for example, a "floppy disk"), and an optical-disk drive configured to read from or write to a removable and nonvolatile optical disk, such as a compact disc read-only memory (CD-ROM), a digital video disc-read only memory (DVD-ROM), or other optical media, may be provided. In those cases, each drive may be connected to the bus 718 through one or more data medium interfaces. The storage device 728 may include at least one program product having a set of (e.g., at least one) program modules configured to perform functions in respective embodiments of the present disclosure.

A program/utility 740 having a set of (at least one) program modules 742 may be stored, for example, in the storage device 728. The program modules 742 include, but are not limited to, an operation system, one or more applications, other program modules and program data. Each of the examples or a certain combination thereof may include an implementation of a network environment. The program module 742 typically performs the functions and/or methods in the embodiments described in the disclosure.

Further, the server 712 may communicate with one or more external devices 714, such as a keyboard, a pointing device and a display 724, and may also communicated with one or more terminals that enable the user to interact with the server 712, and/or communicate with any terminals, such as a network card and a modem, that enable the server 712 to communicate with one or more other computer terminals. Such communication may be implemented through an input/output (I/O) interface 722. In addition, the server 712 may also communicate with one or more networks, such as a local area network (LAN), a wide area network (WAN), and/or a public network such as the Internet, through a network adapter 720. As illustrated in FIG. 9, the network adapter 720 may communicates with other modules in the server 712 through the bus 718. It should be understood that, although not shown in the drawings, other hardware and/or software modules may be utilized in combination with the server 712, including but not limited to: a microcode, a terminal driver, a redundant processor, external disk drive arrays, a redundant-arrays-of-independent-disks (RAID) system, a tape drive, and a data backup storage system.

The processor 716 performs various functional applications and data processing by running programs stored in the storage device 728, for example, for implementing the machine learning training method applied to the machine learning controller in the server according to any embodiment of the present disclosure. The method may include:

acquiring training data uploaded by a terminal;

creating a trusted execution environment in response to a machine learning training request from the terminal; and performing machine learning training based on the trusted execution environment and the training data.

The embodiment of the present disclosure further provides a terminal, including: one or more processors; a storage device, configured to store one or more programs, in which, when the one or more programs are executed by the one or more processors, the one or more processors are configured to implement the machine learning training method applied to the terminal as provided by the embodiments of the present disclosure. The method includes:

uploading training data to a machine learning controller in a server; and sending a machine learning training request to the machine learning controller, so as to enable the machine learning controller to create a trusted execution environment and to perform machine learning training based on the trusted execution environment and the training data.

Certainly, those skilled in the art will understand that the processor may also implement the technical solution of the machine learning training method applied to the terminal according to any embodiment of the present disclosure. For an introduction of the hardware structure and functions of the terminal, reference may be made to the content in Embodiment 7.

Embodiment 8

Further, the embodiment 8 of the present disclosure provides a computer readable storage medium having a computer program stored thereon. When the program is executed by a processor, a machine learning training method applied to a machine learning controller in a server according to any one of the embodiments of the present disclosure is implemented. The method may include:

acquiring training data uploaded by a terminal;

creating a trusted execution environment in response to a machine learning training request from the terminal; and performing machine learning training based on the trusted execution environment and the training data.

The computer storage medium according to the embodiments of the present disclosure may adopt any combination of one or more computer readable media. The computer readable medium may be a computer readable signal medium or a computer readable storage medium. The computer readable storage medium may be, for example, but not limited to, electronic, magnetic, optical, electromagnetic, infrared, or a semiconducting system, an apparatus, or a device, or any combination of them. More specifically, but not listed exhaustively, examples of the computer readable storage medium may include: an electrical connection with one or more wires, a portable computer disk, a hard disk, a random access memory (RAM), a read only memory (ROM), an erasable programmable read only memory (EPROM or a flash memory), an optical fiber, a portable compact disk-read only memory (CD-ROM), an optical storage device, a magnetic storage device, or any suitable combination of them. In this application, a computer readable storage medium may be any tangible medium that contains or stores a program to be utilized by or in connection with an instruction execution system, apparatus, or device.

A computer readable signal medium may include a data signal that is propagated in a baseband or as part of a carrier, carrying computer readable program codes. The data signal propagated in this manner may adopt a plurality of forms including, but not limited to, an electromagnetic signal, an optical signal, or any suitable combination thereof. The computer readable signal medium may also be any computer readable medium other than a computer readable storage medium. The computer readable medium may send, propagate, or transmit a program to be utilized by or in connection with an instruction execution system, apparatus, or device.

Program codes contained in the computer readable medium may be transmitted over any suitable media, including but not limited to a wireless connection, a wired connection, a fiber optic cable, RF, or any suitable combination thereof.

Computer program codes for performing the operations of the present disclosure may be written in one or more programming languages, or a combination thereof. The programming languages may include an object-oriented programming language such as Java, Smalltalk, C++, and traditional procedural programming languages such as the C language or the like. The program codes may be entirely executed on the user's computer, partly executed on the user's computer, executed as a stand-alone software package, executed partly on the user's computer and partly on a remote computer, or entirely executed on the remote computer or terminal. In a case involving the remote computer, the remote computer may be connected to the user's computer through any kind of network, including a local area network (LAN) or a wide area network (WAN), or may be connected to an external computer, for example, through the Internet provided by an Internet service provider.

Further, the embodiments of the present disclosure provide another computer readable storage medium having a computer program stored thereon. When the program is executed by a processor, a machine learning training method applied to a terminal may be implemented, including:

uploading training data to a machine learning controller in a server; and sending a machine learning training request to the machine learning controller, so as to enable the machine learning controller to create a trusted execution environment and to perform machine learning training based on the trusted execution environment and the training data.

Certainly, a computer program in a computer readable storage medium according to an embodiment of the present disclosure is not limited to the operations as described above, and may perform relevant operations of the machine learning training method applied to the terminal according to any embodiment of the present disclosure. For an introduction to the storage medium, reference may be made to the explanation in Embodiment 8.

It is to be noted that the above-mentioned embodiments are only preferred embodiments of the present disclosure and technical principles applied thereto. It will be understood by those skilled in the art that the present disclosure is not limited to particular embodiments described herein. Those skilled in the art are capable of making apparent changes, rearrangements and substitutions without departing from the scope of the present disclosure. Consequently, although the present disclosure has been described in detail above with reference to the embodiments, the present disclosure is not limited to the above embodiments, and other equivalent embodiments may be included without departing from the spirit of the present disclosure. The extent of the present application is to be determined by the attached claims.

What is claimed is:

1. A machine learning training method, applied to a machine learning controller in a server, comprising:

acquiring training data uploaded by a terminal, wherein the training data is encrypted training data encrypted with an encryption key at the terminal, and comprises training data from at least two data providers;

creating a trusted execution environment in response to a machine learning training request from the terminal;

establishing a trusted communication link between the terminal and the trusted execution environment, wherein the trusted communication link is configured to transmit the encryption key of the terminal to a key manager in the trusted execution environment, the key manager being configured to manage the encryption key;

submitting the encrypted training data of each data provider and preset training parameters to a data fusion manager in the trusted execution environment, decrypting the encrypted training data of each data provider by the data fusion manager according to an encryption key of each data provider, and fusing the decrypted training data according to a preset fused data format to obtain fused training data;

triggering a target algorithm in a machine learning algorithm library in the executed execution environment, and training the fused training data according to the training parameters in the trusted execution environment; and acquiring a machine learning model obtained after training.

2. He method according to claim 1, before establishing the trusted communication link between the terminal and the trusted execution environment, further comprising:

sending information to be authenticated of the server and the trusted execution environment to the terminal, and enabling the terminal to perform remote authentication on the trusted execution environment through a remote authentication server of the trusted execution environment based on the information to be authenticated; and executing an operation of establishing the trusted communication link when the authentication is successful.

3. The method according to claim 1, wherein an operation for fusing the decrypted training data comprises: splitting data column by column and splitting data row by row.

4. The method according to claim 1, wherein the acquired machine learning model is a model encrypted in the machine learning algorithm library in the trusted execution environment.

5. The method according to claim 3, wherein the acquired machine learning model is a model encrypted in the machine learning algorithm library in the trusted execution environment.

6. A server, comprising:
one or more processors;
a storage device, configured to store one or more programs, wherein, when the one or more programs are executed by the one or more processors, the one or more processors are configured to implement a machine learning training method, the method comprising:

acquiring training data uploaded by a terminal, wherein the training data is encrypted training data encrypted with an encryption key at the terminal, and comprises training data from at least two data providers;

creating a trusted execution environment in response to a machine learning training request from the terminal;

establishing a trusted communication link between the terminal and the trusted execution environment, wherein the trusted communication link is configured to transmit the encryption key of the terminal to a key manager in the trusted execution environment, the key manager being configured to manage the encryption key;

submitting the encrypted training data of each data provider and preset training parameters to a data fusion manager in the trusted execution environment, decrypting the encrypted training data of each data provider by the data fusion manager according to an encryption key of each data provider, and fusing the decrypted training data according to a preset fused data format to obtain fused training data;

triggering a target algorithm in a machine learning algorithm library in the executed execution environment, and training the fused training data according to the training parameters in the trusted execution environment; and acquiring a machine learning model obtained after training.

7. The server according to claim 6, wherein, before establishing the trusted communication link between the terminal and the trusted execution environment, the method further comprises:

sending information to be authenticated of the server and the trusted execution environment to the terminal, and enabling the terminal to perform remote authentication on the trusted execution environment through a remote authentication server of the trusted execution environment based on the information to be authenticated; and executing an operation of establishing the trusted communication link when the authentication is successful.

8. The server according to claim 6, wherein an operation for fusing the decrypted training data comprises: splitting data column by column and splitting data row by row.

9. The server according to claim 6, wherein the acquired machine learning model is a model encrypted in the machine learning algorithm library in the trusted execution environment.

* * * * *